Sept. 28, 1965 T. BUDZICH 3,208,395
CYLINDER BARREL SUSPENSION FOR FLUID PRESSURE
ENERGY TRANSLATING DEVICE
Filed Aug. 30, 1963 4 Sheets-Sheet 1

INVENTOR
TADEUSZ BUDZICH
By William N Hogg
Attorney

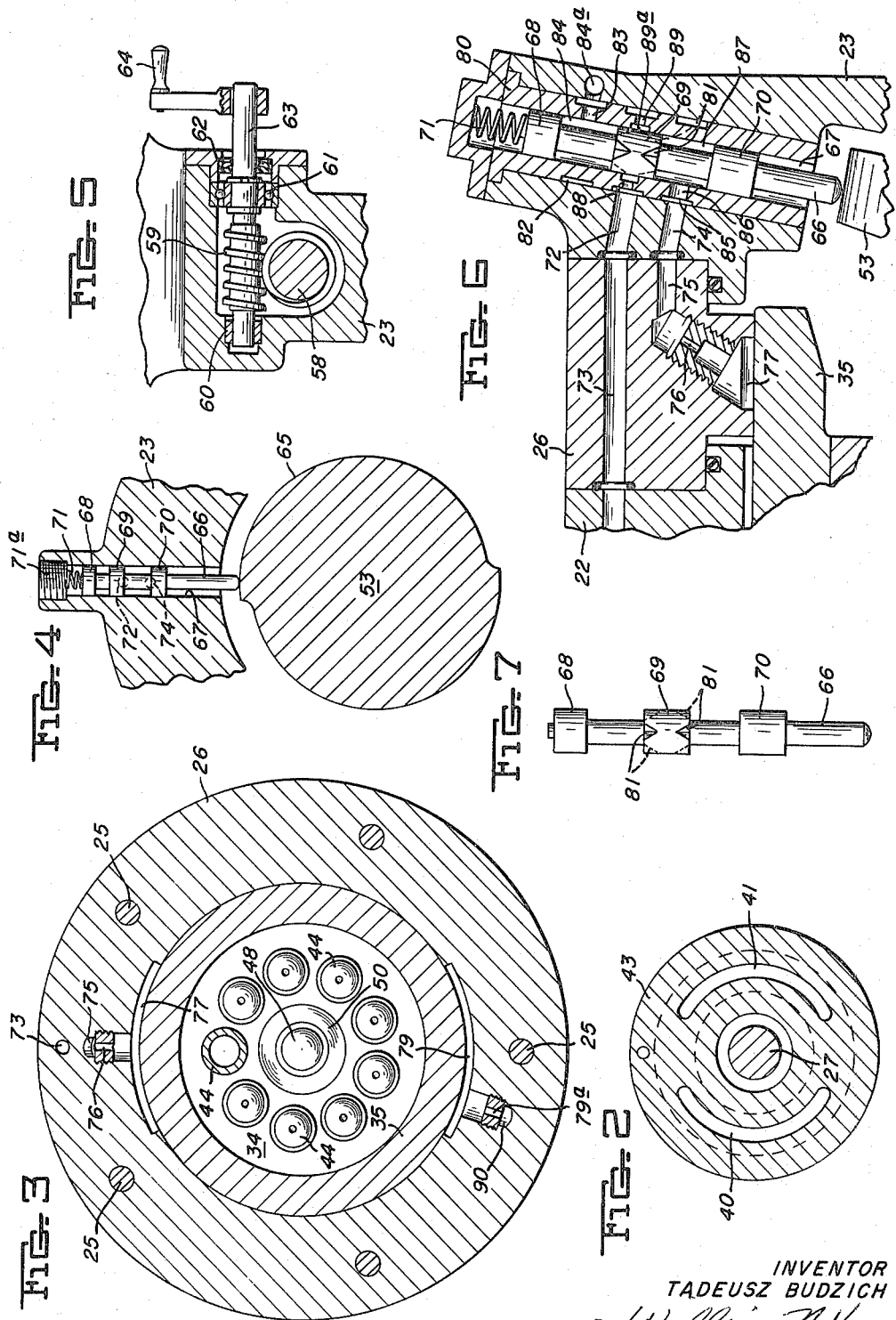

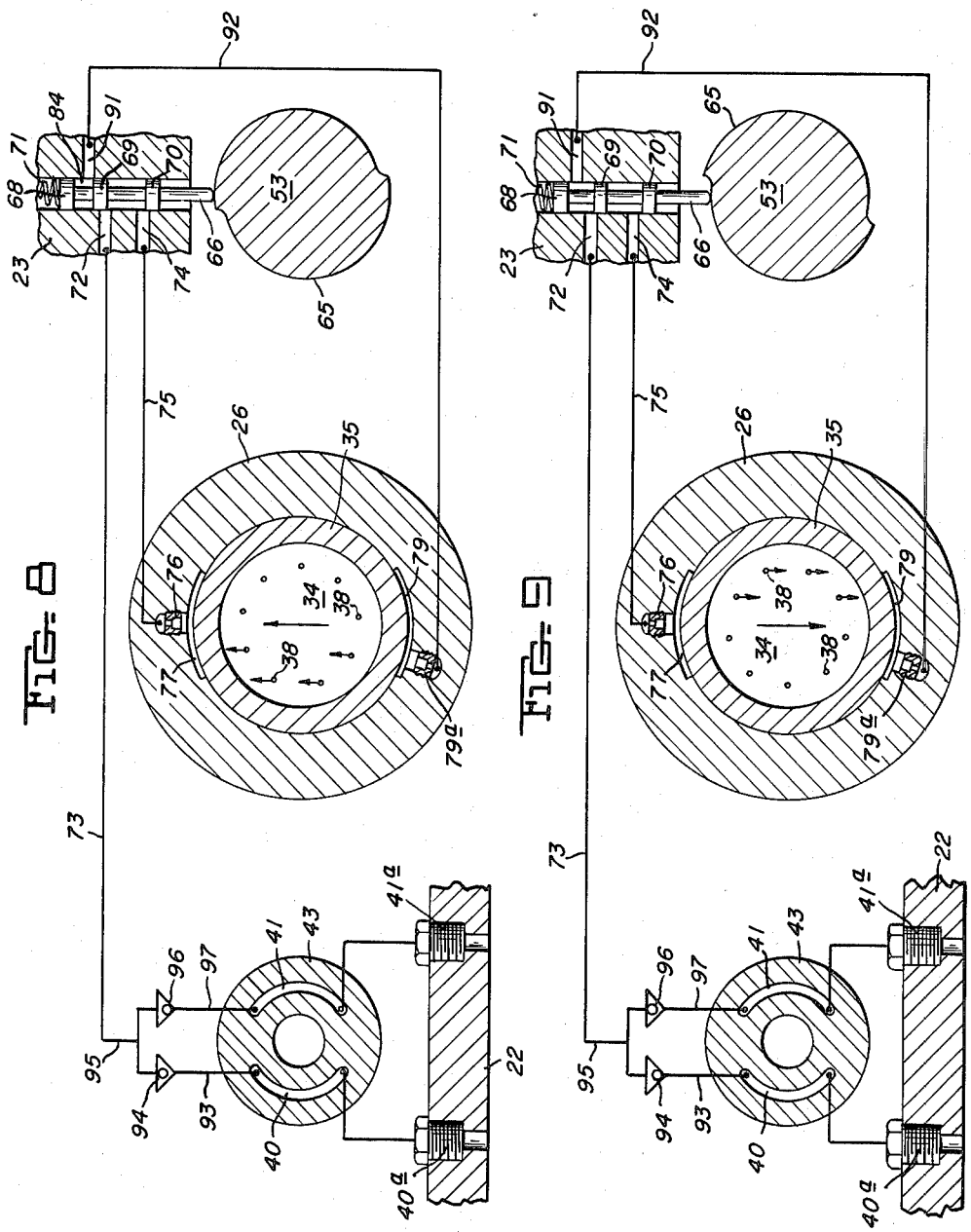

Sept. 28, 1965 T. BUDZICH 3,208,395
CYLINDER BARREL SUSPENSION FOR FLUID PRESSURE
ENERGY TRANSLATING DEVICE
Filed Aug. 30, 1963 4 Sheets-Sheet 4
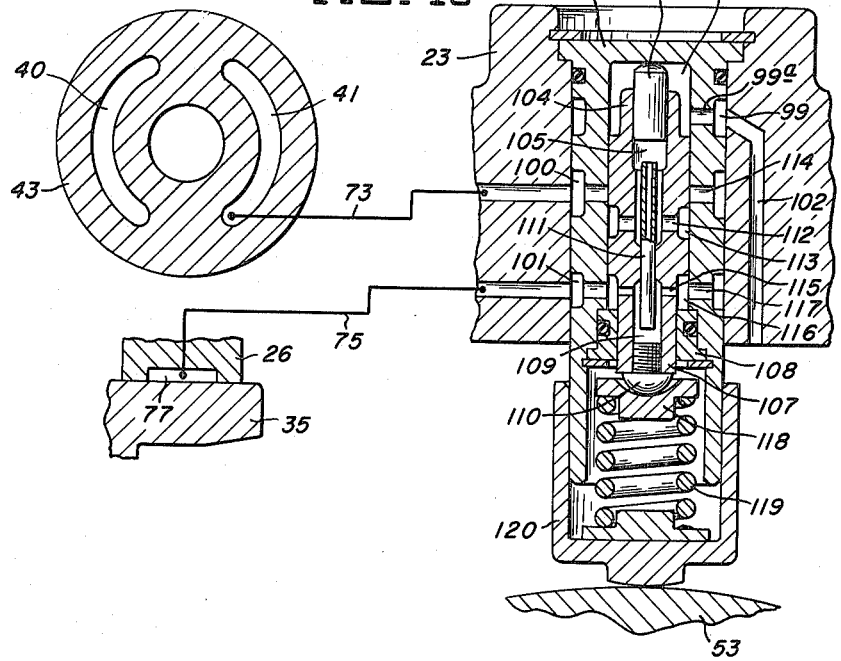
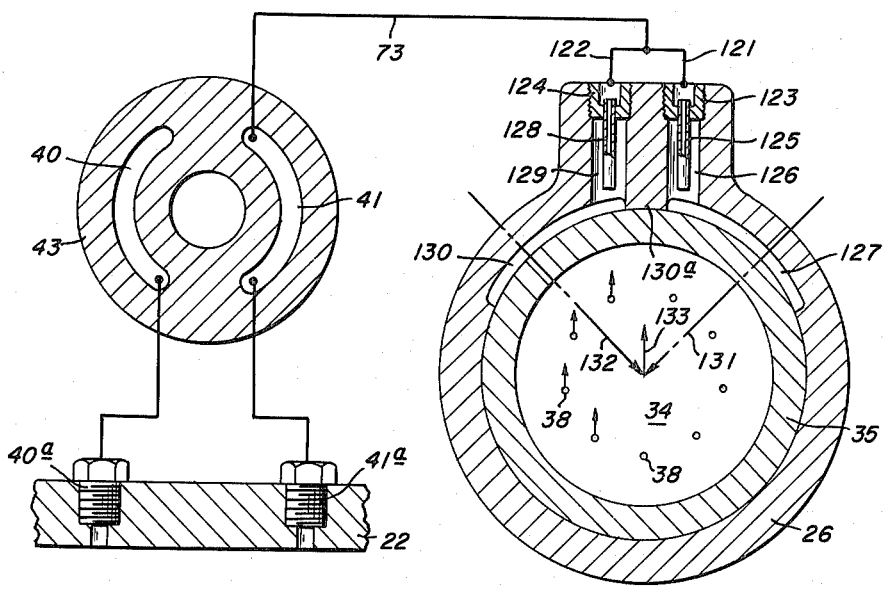
INVENTOR
TADEUSZ BUDZICH
By William N. Hogg
Attorney

United States Patent Office

3,208,395
Patented Sept. 28, 1965

3,208,395
CYLINDER BARREL SUSPENSION FOR FLUID PRESSURE ENERGY TRANSLATING DEVICE
Tadeusz Budzich, 3344 Colwyn Road, Cleveland, Ohio
Filed Aug. 30, 1963, Ser. No. 305,611
25 Claims. (Cl. 103—162)

This invention relates generally to piston pumps and motors employing a rotating cylinder barrel.

In more particular aspects this invention relates to the suspension of a rotating cylinder barrel in piston pumps and motors.

In conventional prior art pumps and motors the rotating cylinder barrel was usually supported by a conventional roller bearing or, in some instances, by a hydrodynamic bearing. These bearings, engaging the outer periphery of the cylinder barrel, were usually located in a plane perpendicular to the axis of rotation and passing through a point established by the intersection of the plane connecting the spherical piston ends and axis of rotation of the cylinder barrel.

The suspension of the cylinder barrel by a roller bearing suffers from the following disadvantages: the roller bearing by necessity must be of comparatively large diameter to encircle the barrel. Since such a bearing in high pressure piston pumps and motors must carry large radial loads, this large diameter will impose severe life limitations on the unit at high speeds of operation. The life of such bearings is further reduced by the fluctuating nature of these radial loads.

The hydrodynamic bearing, although less susceptible to excessive wear at the maximum speed of the unit, suffers from one serious disadvantage. The load carrying capacity of the hydrodynamic bearing can only be developed when the loaded surfaces are subjected to high relative velocity. Therefore this type of bearing displays very undesirable characteristics at low speeds of rotation and especially when the unit is starting under a load.

The employment of hydrodynamic bearing suspension, used for cylinder barrel location and hydrostatic principle to balance the radial load, could provide a compromise. However, the radial load to be carried by hydrostatic balance is of a fluctuating nature and therefore normally cannot be balanced by a single surface, subjected to hydrostatic pressure. This variation in the radial load is caused by the uneven number of pistons usually employed in high pressure pumps and motors. In such pumps and motors the radial load will continuously fluctuate within the magnitude of the full radial force component of one piston. The mean level of the radial force, for any specific angular inclination of the cam, could be hydrostatically balanced but, the solution would not be satisfactory. The problem becomes more complicated, especially in variable displacement piston pumps and motors, where the angle of inclination of the cam and therefore the magnitude of the radial load is changing with the pump or motor displacement. Under these circumstances, the solution employing conventional principle of hydrostatic balance, for such a variable and fluctuating load, becomes completely impractical.

It is therefore a principal object of this invention to provide a new and improved suspension of a rotating cylinder barrel using a hydrodynamic bearing, utilizing hydrostatic balance principle.

Another object of this invention is to provide hydrostatically balanced suspension of radial loads, acting on a rotating cylinder barrel for variable and overcenter piston pumps and motors.

Still another object of this invention is to provide hydrostatic cylinder barrel suspension which will balance the fluctuating radial load components.

Still a further object of this invention is to provide a hydrostatically balanced radial bearing, utilizing fluid under pressure to support pumping loads and to journal the cylinder barrel in respect to the housing.

Yet an additional object of this invention is to provide a hydrostatic bearing, radially locating a rotating cylinder barrel and supplied by pressure fluid from the pump or motor timing mechanism, with the pressure fluid being properly phased by the stroke changing mechanism to provide a hydrostatic balance at different cam angles, in the zone of both forward and reverse pumping.

Other objects, features and advantages of this invention will readily become apparent to those skilled in the art and a more complete understanding of the preferred embodiment thereof, as shown in the accompanying drawings and described in the following detailed description.

In the drawings:

FIGURE 2 is a sectional view taken substantially along the plane of line 2—2 of FIGURE 1;

FIGURE 3 is a sectional view of the hydrostatic bearing taken substantially along the plane of line 3—3 of FIGURE 1;

FIGURE 4 is a fragmentary cross-sectional view of the control valve and cam taken substantially along the plane of line 4—4 of FIGURE 1;

FIGURE 5 is a sectional view of the stroke changing mechanism taken substantially along the plane of line 5—5 of FIGURE 1;

FIGURE 6 is an enlarged fragmentary sectional view of a modified control valve for use with hydrostatic bearing;

FIGURE 7 is an elevational view of the valve spool of FIGURE 6 showing construction of the timing notches;

FIGURE 8 is a diagrammatic representation of the fluid connections and working principle of the hydrostatic bearing suspension of the cylinder barrel, employing principles of this invention, in working position shown in FIGURE 1;

FIGURE 9 is similar to FIGURE 8 but diagrammatically showing the pump or motor working in an over-center position with cam plate rotated through 180°;

FIGURE 10 is an enlarged sectional view of a modified 5 form of the fluid control valve; and FIGURE 11 is a sectional view somewhat diagrammatic of a modified form of balancing grooves.

Figure 1:
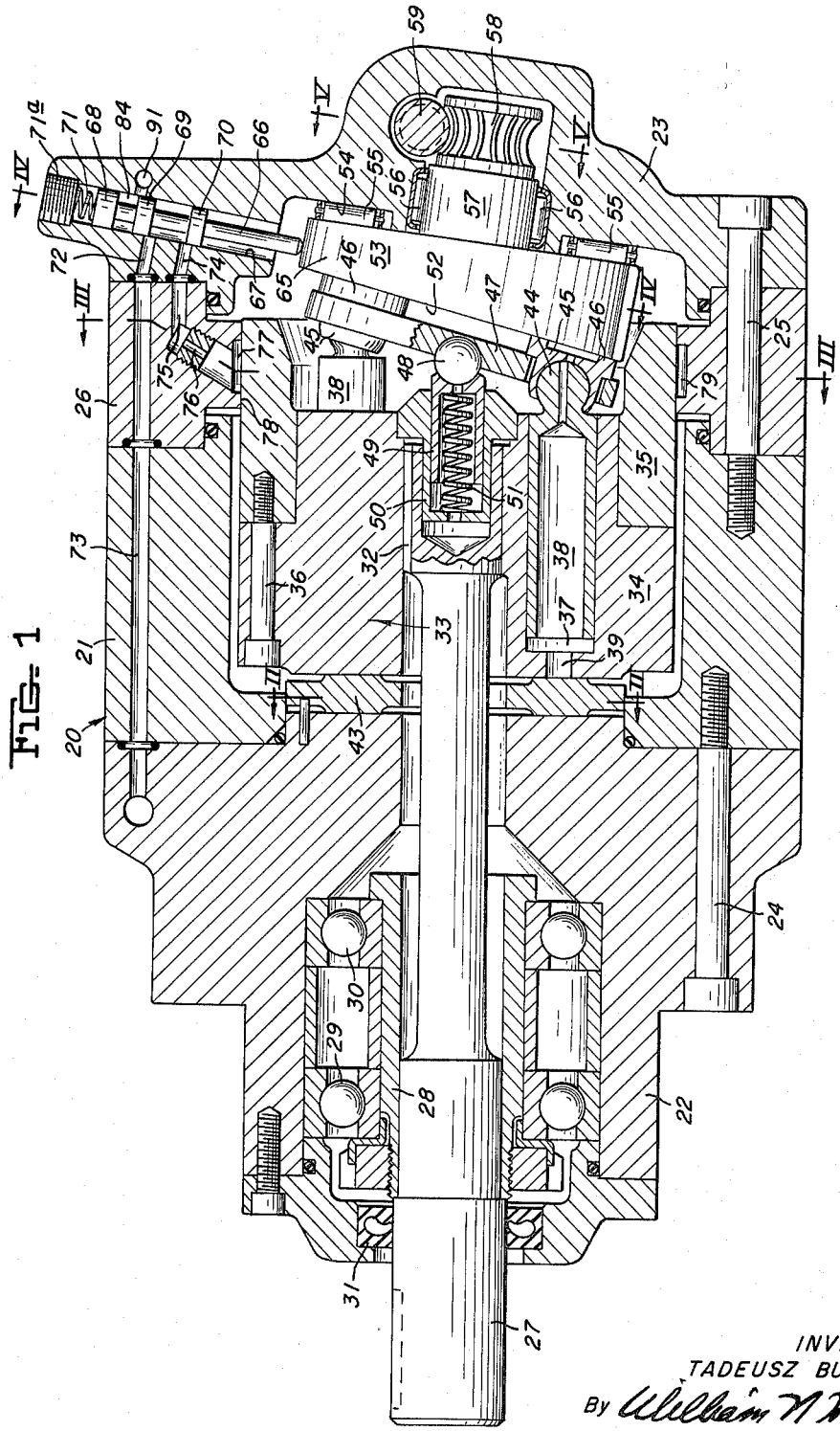
FIGURE 1 is a longitudinal sectional view through a variable displacement pump or motor incorporating the cylinder barrel suspension of the present invention.

Referring now to the drawings, and for the present FIGURE 1, a pump housing, generally designated as 20, is made up of a mid-section 21, with a port end 22 and cam end cover 23 each secured to the mid-section 21 by bolts 24 and 25 respectively. A bearing ring 26 is sandwiched between mid-section 21 and end cover 23, bolts 25 being used to maintain bearing ring 26 in position. A drive shaft 27 with a drive shaft sleeve 28 is journalled in port end 22 by bearings 29 and 30 and sealed by a conventional shaft seal 31. The drive shaft 27, through its splined end 32, drivingly engages a cylinder barrel generally designated as 33. The cylinder barrel 33 has a cylinder block 34 and a cylinder block sleeve 35, connected thereto by bolts 36. The cylinder block 34 is provided with a plurality of cylinder bores 37 each slidably mounting a piston 38. The cylinder bores 37, in a well known manner, are connected through slots 39 with kidney ports 40 and 41 of valve plate 43 (FIGURE 2). The valve plate 43 abuts against port end 22, the kidney ports 40 and 41 communicating with the inlet and outlet ports of the pump (diagrammatically shown in FIGURES 8 and 9 designated 40a and 41a respectively). The pistons 38 are equipped with spherical ends 44 universally mounting piston shoes 45. Piston shoes 45 are equipped with enlarged flange ends 46 which are engaged by a nutating plate 47. The nutating plate 47 is pivoted by ball 48, engaged by nutating plate support 49, guided in plug 50 retained in the splined end 32 of the drive shaft 27. The nutating plate support 49 is biased towards engagement with ball 48 by nutating plate spring 51. Enlarged flange ends 46, of piston shoes 45, slidably engage surface 52 of cam 53. The cam 53 is maintained on an inclined surface 54 provided in the cover 23 and journalled in cover 23 by bearings 55 and 56. The cam 53 has a stem 57 equipped with a worm gear 58 which is engaged in a conventional manner by worm 59. Referring now to FIGURE 5 the worm 59 is journalled in cover 23 by bearings 60 and 61 and sealed by shaft seal 62. The worm 59 has a shaft extension 63 connected to a control handle 64. The cam 53 on its outer periphery is equipped with cam surface 65 (see FIGURE 4), which engages a control spool 66 located in a bore 67 provided in the cover 23. The control spool 66 is equipped with lands 68, 69 and 70 and is biased towards engagement with the cam surface 65 by a control spring 71 retained in the bore 67 by plug 71a. Referring again to FIGURES 1 and 3 the control valve bore 67 is connected by passage 72 and drilling 73 to the source of high pressure fluid and through pasages 74 and 75 to a metering orifice 76 in the bearing ring 26. The orifice 76 is in direct communication with a balancing relief or groove 77, provided on internal cylindrical surface 78, of the bearing ring 26. A second balancing relief or groove 79 is located diametrically opposite balancing relief 77 and is connected with the control valve bore 67 through drilled passages not shown (but shown schematically as 91 and 92 in FIGURES 8 and 9). The bearing ring 26, with its internal cylindrical surface 78, journals cylinder block sleeve 35.

A modified version of the control valve is shown in FIGURES 6 and 7. The basic principle of construction is similar to that shown in FIGURES 1 and 4 with the exception that the valve bore 67 is located in a valve sleeve 80 and that the land 69 is equipped with V notch metering slots 81. The valve sleeve 80 is equipped with circular recess 82, communicating by drilling 83 with annular space 84, defined by lands 68 and 69 and through drillings 84a with balancing relief 79 (through orifice 79a shown diagrammatically in FIGURES 8 and 9). Circular recess 85 communicates directly through drilling 86 with annular space 87, defined by lands 69 and 70 and through drillings 74 and 75 with orifice 76 and balancing relief 77. The high pressure fluid is supplied to a recess 88 by passages 73 and 72. Drilling 89 communicates recess 88 with recess 89a, which works in direct communication with metering slots 81, located on the land 69.

FIGURES 8 and 9 show diagrammatic representations of the functional relationship of components, described in FIGURES 1 to 7. Referring now to FIGURE 8, the kidney port 40 is connected through passage 93, check valve 94 and duct 95 to passage 73. The kidney port 41 is connected through passage 97 and check valve 96 to duct 95 and therefore to passage 73 which is the high pressure fluid passage.

*Operation*

The device as shown in FIGURE 1, although it can work as a fixed or variable displacement pump or motor, will be described as a variable displacement pump. The rotary motion from an external source, not shown, is supplied through drive shaft 27 by splined end 32 to cylinder barrel 33. The pistons 38 follow the inclined surface 52 of cam 53 and in a well known manner cause the pistons 38 to reciprocate. On the high pressure stroke the piston assemblies are maintained against the cam surface 52 by the available pressure differential. During the low pressure portion of the stroke the piston shoes 45 and therefore pistons 38 are maintained against surface 52 of cam 53 by the nutating plate 47, slidably engaging enlarged flange ends 46 of piston shoes 45. The force necessary to maintain the piston shoes in contact with the cam surface, against their own inertia and suction pressure differential forces, is supplied to the nutating plate 47 from nutating plate spring 51 through the ball 48. The biasing force from the nutating plate spring 51 is transmitted to the ball 48 through nutating plate support 49.

The reciprocating motion of pistons 38 will induce fluid circulation within cylinder bores 37, which circulation, in a well known manner, is phased through slots 39 and kidney ports 40 and 41 to pump inlet and outlet ports. Since the pistons 38, on their full cross-section area, at one end are subjected to the full pumping pressure and at the other abut (through piston shoes) against the inclined surface of the cam, a radial component of the pumping reaction force, caused by the inclined plane, will act through the center of the spherical piston ends. This radial component will induce canilever loads between the piston and the cylinder barrel. These cantilever loads will be transmitted to the cylinder barrel inducing radial loads. These radial loads are contained on the cylindrical surface 78, of the bearing ring 26, which engages cylinder block sleeve 35. The bearing ring 26 is selected so that its centerline is located in a plane passing through the point of intersection of the plane connecting the centers of the spherical piston ends and the axis of rotation of the cylinder barrel 35. With this location of the bearing ring 26 the radial piston loads are contained on the cylindrical bearing surface 78 in the form of bearing pressure, without inducing a transverse couple in the cylinder barrel 33 and therefore without upsetting the force equilibrium on the cylinder barrel sealing face, working in abutment with valve plate 43. The resultant radial force, caused by the inclination of cam surface 52, always follows the direction of inclination of the surface in the direction of the mechanical advantage, as illustrated in FIGURES 8 and 9. FIGURE 8 shows the direction of the radial forces of individual pistons and the resultant force with the cam inclination being the same as shown in FIGURE 1. At any instant the magnitude of these individual forces and therefore the magnitude of the resultant force will be proportional to discharge pressure and to the angle of inclination of the cam surface. However, in a pump with an odd number of pistons the number of pistons subjected to high pressure at an instant will vary. FIGURES 8 and 9 show a nine piston pump arrangement and show four pistons subjected to high pressure. However, with a nine piston pump arrangement, the number of pistons subjected to high pressure will fluctuate between four and five, eighteen times in one revolution. Therefore, the resultant radial force will continuously fluctuate within the magnitude of a radial component of one piston. Assuming the same discharge pressure and the same angular inclination of the cam surface as shown in FIGURE 1 but with the cam 53 rotated through 180°, the magnitude of the resultant radial force will remain the same but its direction will be reversed as shown in FIGURE 9.

The cam 53 is located on an inclined surface 54 in cover 23 by bearing 55. The rotation of the cam 53 due to the action of two inclined planes will change the effective inclination of cam surface 52 in respect to pump housing 20. As shown in the drawings the angular inclination of the cam wedge and the supporting surface are equal and add to a maximum angular inclination equal to their sum and in summation provide the maximum angular inclination of the working cam surface. This showing is for the purpose of illustrating the various features of the device. To provide the desired over-center operation (i.e. reversal) of the angularity of the inclined plane 0° angle would not lie in the plane of the section of the drawing of FIGURE 1 but would lie in a plane normal thereto. Then the selection of maximum angle of the supporting surface and the angle of the wedge of the cam will each be equal to the maximum angle of inclination of the device. Under these circumstances 180° rotation of the cam will move the cam angle from a maximum in one direction through 0° angle to a maximum in the opposite direction. The cam 53 is rotated in respect to cover 23 by the gear and worm arrangement, shown in FIGURE 5. Rotation of the control handle 64 and associated rotation of worm 59 through worm gear 58 will rotate cam 53.

Balancing recesses 77 and 79 are located substantially in the line of action of the radial resultant force (see FIGURES 8 and 9). The direction of the radial resultant force lies in a plane defined by the line of the axis of rotation of the pump and a line on the surface of the cam plate passing through the axis of rotation of the pump at maximum cam plate angular inclination to said axis of rotation, said latter named line being known as the principal axis of the pump. The balancing recesses are contained within the cylindrical surface 78 journalling the cylinder block sleeve 35. High pressure fluid, depending on the direction of the resultant radial force is fed into corresponding recess to reduce the bearing pressure between the cylinder block sleeve 35 and the cylindrical surface 78. The cylinder block sleeve 35 is journalled in respect to cylindrical surface 78 with a clearance therebetween. Calibrated orifices 76 and 79a are interposed between the source of high pressure fluid and balancing recesses 77 and 79. The fluid supplied to orifice 76 or 79a is of sufficient magnitude that when reacting on the cylinder block sleeve 35, within the area of balancing recess and the associated pressure gradient of the surfaces enclosing the recess, will generate sufficient force to contain the maximum radial resultant force, generated in the cylinder barrel. Since depending on the discharge pressure of the pump and on the angle of inclination of the cam surface, this resultant force, fluctuating within the magnitude of a radial component of one piston, will vary, the balancing pressure, within the balancing recess 77 or 79, must vary proportionally, to prevent generation of excessive bearing loads between cylinder block sleeve 35 and the cylindrical surface 78. To small balacing pressure will not be sufficient to balance the radial component, too high balancing pressure will tend to move the cylinder barrel within the bearing clearance and overcome the resultant radial force component load on the opposite side of the cylindrical surface 78. The necessary pressure level in the balancing recesses 77 or 79 is maintained in the following way. The size of the metering orifices 76 and 79a are so selected, in respect to the total available bearing clearance, that the position of the cylinder block sleeve 35, within the available clearance with respect to the cylindrical surface 78 will automatically regulate the pressure in balancing recesses by the throttling effect of orifices 76 and 79a. Assume that maximum source pressure is supplied through passage 75 to orifice 76 and that the radial resultant force will increase from a position of equilibrium. The cylinder barrel, under action of this radial force, will tend to move toward the balancing recess, effectively reducing the clearance and therefore area of leakage of the fluid, supplied to balancing recess. This reduction in area available for leakage will effectively reduce the volume of fluid passing through the orifice and therefore decrease the throttling loss through the orifice, automatically increasing the fluid pressure within the balancing recess and therefore increasing the load carrying capacity of the hydrostatic bearing. Conversely a reduction in radial resultant force will cause cylinder block sleeve 35 to move away from the balancing recess, increasing the effective area of leakage. Due to the increased flow the throttling losses through the orifice will increase, reducing the pressure in the balancing recess until the point of equilibrium is reached. Therefore in this arrangement the cylinder barrel, for each level of radial resultant force, will find its own position of floating equilibrium, the cylindrical surface 78 acting only as a guiding and stabilizing surface. Up to this point it has been assumed that fluid is supplied to the balancing recess through the orifice at a certain selected pressure level. Actually as shown in FIGURES 8 and 9 the pressure fluid may be supplied from the high pressure port of the pump itself, in which the pressure will vary. Under these circumstances the area of the balancing recess is selected to provide sufficient reaction to completely balance the radial resultant force at maximum cam angle, at minimum losses through the throttling orifice. Since the mean radial resultant force is proportional to the discharge pressure, the variation in the leakage area, due to varying working clearance will be only affected by the change in cam angle and small oscillations due to periodic nature of the radial force caused by the variation in number of pistons subjected to high pressure.

It will be readily apparent that the balance recess can be supplied with a fixed volume flow from a separate small fixed displacement pump, independently driven or, driven by drive shaft 27. In this case the balancing pressure within the balancing recess will be automatically adjusted by the position of the cylinder block sleeve 35, in respect to balancing recess. For each force level the clearance then automatically adjusts itself, to maintain equivalent balancing pressure, constant fluid flow being maintained across the balancing surfaces.

As already explained, with the cam surface perpendicular to axis of rotation, the resultant radial force becomes zero. Change in angle of inclination of the cam surface from this position will not only gradually increase the magnitude of the resultant radial force, but at the same time, will reverse its direction, as shown in FIGURES 8 and 9. The cam 53 on its periphery is equipped with cam surface 65 as shown in FIGURE 4. This cam surface 65, with rotation of cam 53, will move spool 66, of direction control valve, connecting either of the balancing recesses to the high pressure fluid. The mid-position of the cam surface 65 corresponds with zero angle of inclination of cam surface 52. In this position the land 69 blocks completely pressure fluid from either of the balancing recesses. Rotation of the cam 53 from this position, in either direction, will alter the direction of the resultant force and connect corresponding balancing recess with the high pressure fluid to hydrostatically balance this resultant force. In FIGURES 8 and 9 the spool of the direction control valve is shown moved by cam surface 65 to two maximum flow positions, corresponding to forward and reverse flow. As shown in FIGURES 8 and 9 the high pressure fluid is supplied through check valve 94 or 96 to the high pressure fluid passage 73, connected with the direction control valve. Depending on the unit working as a pump or a motor, the polarity of ports 40 and 41 may change. Since the angle of inclination of the cam 53 remains the same, this change in polarity of the kidney ports will not affect the direction of the radial resultant force and the device will remain operative. If kidney port 40 is the high pressure port and the kidney port 41 is the low pressure port the check valve 94 will permit flow of high pressure fluid to passage 73, the check valve 96 effectively closing high pressure fluid from low pressure kidney port 41. With kidney port 41 being subjected to high pressure the check valve 96 will open, the check valve 94 will close, the passage 73 being supplied with high pressure fluid.

A modified construction of direction control valve is shown in FIGURE 6. The central land 69 is equipped with metering slots 81. The land 69, at zero inclination of the cam surface 52, effectively cuts off high pressure fluid from balancing recesses 77 and 79. Rotation of the cam 53 in either direction, from this neutral position, will, depending on direction of rotation, connect balancing recess 77 or 79 through gradually increasing area of flow of metering slots 81. This constitutes a variable orifice, interposed between the pressure source and the balancing recess. The area of the metering slots can be so arranged that increase of this area of variable orifice with the increase in the cam angle will maintain the cylinder block working in respect to the balancing recess at relatively constant clearance. In this way the throttling effect of the orifice is varied with the effective cam angle, the supply pressure connected to the pump discharge being proportional to the resultant radial force. Metering slots 81 can be working in series with the orifice 76 especially for pumps designed for high pressure operation as shown in FIGURE 6 or, can be directly connected to balancing recess 77 without the use of orifice 76. With this arrangement the greater the inclination of the cam (which results in greater radial loads) the smaller will be the throttling loss and therefore the greater will be the pressure of the fluids supplied to the proper balancing recess.

FIGURE 10 shows still another modification of the control valve that can be used in controlling flow of high pressure fluid from high pressure kidney port 41 to balancing relief 77. The valve includes a sleeve 98 mounted in the end over 23. The valve sleeve 98 is equipped with circular recesses 99, 100 and 101. The circular recess 99 is connected through passage 102 with the low pressure space within the pump housing 20. The recess 100 is connected to the high pressure port 41 through passage 73 and circular recess 101 is connected to the balancing recess 77 through passage 75. The valve sleeve 98 is provided with a cylindrical bore 103 slidably guiding a valve spool 104. The valve spool 104 has a bore 105 at one end and at the other end terminates in reduced diameter section 107. The reduced diameter section 107 is slidably mounted in a plug 108 which plug is retained in valve sleeve 98. The reduced diameter section 107 contains a tapped drilling 109 closed by threaded plug 110. The bore 105 and the drilling 109 are connected by a length of capillary tubing 111 which is retained in the valve spool 104. The bore 105, depending on the position of the valve spool 104, can be connected through drillings 112, annular recess 113, drillings 114 to circular recess 100. The drilling 109 is connected through passages 115 to annular space 116 around the reduced diameter end 107 which annular space in turn communicates through passages 117 with the recess 101. The plug 110 works in contact with spring retainer 118 which locates biasing spring 119. The end of valve sleeve 98 guides actuator sleeve 120 which is biased by spring 119 towards engagement with cam 53.

This control valve is arranged to meter varying quantities of fluid into balancing recess, depending on the position of the cam 53. The spring 119 normally biases the valve spool 104 towards a position where the annular recess 113 communicates with drillings 114 thus connecting high pressure port 41, through the various valve passages, with balancing recess 77. From circular recess 100, the high pressure fluid flows to circular recess 101 through drillings 114, annular recess 113, drillings 112, bore 105, capillary tubing 111, drilling 109, passages 115, annular space 116 and passages 117 to circular recess 101. The upper end of the valve spool 104 works in the upper end of bore 103 which is vented to low pressure by drilling 99a, circular recess 99 and passage 102. With the pressure fluid flowing through the valve, force is generated proportional to the product of the cross-section area of the balancing plunger 106 and the pressure existing in the bore 105. This force tends to oppose the biasing force of the spring 119 and move the valve spool 104 towards the position of cutting off the flow of pressure fluid through the valve by moving annular recess 113 out of communication with drillings 114. On the reduced diameter end of the valve spool 104 an opposing force helping the biasing force of the spring 119 will be generated. This force will be proportional to the product of the difference between the cross-section area of the valve spool 104 at the upper end and cross-section area of the reduced diameter section 107 and the pressure existing in space 116. Assuming that the cross-section area of balancing plunger 106 is equal to the area of annulus defining the space 116; if the pressure in bore 105 would equal the pressure in space 116, the valve spool 104 would be in condition of hydraulic force equilibrium. However, the capillary tube 111 will create substantial resistance to the flow of fluid. Therefore under conditions of flow, pressure in space 116 will be less than the pressure in the bore 105, by the amount equal to the pressure drop through capillary tubing 111. The magnitude of this pressure drop will be proportional to the amount of fluid flowing through the control valve. For condition of equilibrium, the force generated by this pressure drop must be supplied by the spring 119. Therefore for any specific preload of spring 119, the valve spool 104 will automatically establish position relationship between annular recess 113 and drillings 114, so that the quantity of flow passing through the capillary tubing 111 will produce pressure drop through capillary tubing 111 to exactly counterbalance the preload in the spring 119. With constant preload in the spring 119, this valve will always regulate the flow to maintain a constant pressure drop through the capillary tubing 111 and therefore will maintain a constant flow of fluid, from high pressure kidney port 41 to the balancing recess 77. Since the preload in the spring 119 is regulated by the profile of the cam 53, for any specific pump displacement regulated by the angular position of the cam 53 there will be an exact specific amount of pressure fluid supplied to balancing recess 77. The basic operation of the hydrostatic bearing will remain the same as previously described but with this valve arrangement more exact control over fluid flow to the bearing can be exercised. Since this valve is of a self-regulating nature, the flow of pressure fluid to the balancing recess 77 can be tuned exactly to vary as the magnitude of the radial component of the piston reaction force carried by the hydrostatic bearing. It should be noted that for illustration the flow restricting valve shown in FIGURE 10 is shown connected to only one port and one balancing recess; however, suitable valving similar to that shown in FIGURES 8 and 9 can be used for pumps whose polarity is to be reversible.

A modified balancing recess arrangement in combination with viscous resistance of capillary tubing is shown diagrammatically in FIGURE 11. The high pressure kidney port 41 is connected through passage 73 and passages 121 and 122 with plugs 123 and 124 respectively. The plug 123 is equipped with a length of capillary tubing 125 positioned in drilling 126 which communicates with balancing recess 127. The plug 124 is equipped with a length of capillary tubing 128 positioned in drilling 129 which communicates with balancing recess 130. These two recesses functionally take the place of a single balancing recess such as recess 77 shown in FIGURES 3 and 6 and if the polarity of the pump is to be changeable an additional pair is needed to functionally replace recess 79.

Thus, the balancing recess 77 of FIGURES 8 and 9 is divided into two balancing recesses 127 and 130 by a sealing land 130a. The high pressure fluid is fed from high pressure kidney port 41 to balancing recesses 127 and 130 through individual capillary tubes 125 and 128 respectively. For simplicity of graphical representation, only two balancing recesses are shown and the direction control valve and the check valves 94 and 96, shown in FIGURES 8 and 9, are omitted. By providing two additional balancing recesses, in place of balancing recess 79, fed by two additional capillary tubes, the arrangement of FIGURE 11 can be connected into a circuit, as shown in FIGURES 8 and 9, the pairs of capillary tubing being directly connected to passages 75 and 92 of FIGURE 8.

The arrangement of the balancing recesses, as shown in FIGURE 11, provides a better transverse stability of the hydrostatic bearing and is especially advantageous in high speed applications to eliminate high frequency flutter of the cylinder barrel 33 within the available bearing clearance. The capillary tubes 128 and 125 are selected to provide the same pressure drop under the same conditions of fluid flow. Assuming that the cylinder block sleeve would be displaced from right to left as seen in FIGURE 11 within the available bearing clearance, more of the pressure fluid would leak from the balancing recess 127 than from balancing recess 130. This condition would tend to increase the flow rate through the capillary tube 125 and therefore increase the pressure drop. The increase in the pressure drop, through the capillary tube 125, will effectively lower the fluid pressure in balancing recess 127. At the same time the leakage flow from balancing recess 130 will be reduced, increasing the effective pressure of fluid contained in balancing recess 130. Under equilibrium condition, the force vector 133, resulting from summation of the radial load components of individual pistons, will always be balanced by the vertical force components of vector 131, resulting from hydrostatic force developed in balancing recess 127 and vector 132 resulting from hydrostatic force developed in the balancing recess 130. When balancing recesses 127 and 130 contain fluid at the same pressure, the sum of vertical force components of vectors 131 and 132 will balance the vector 133 and the opposing horizontal force components of vectors 131 and 132 will cancel each other, maintaining the bearing in a state of floating equilibrium.

With the cylinder block sleeve 35 displaced from right to left within the available bearing clearance, the vector 132, as already explained, due to increase in pressure in balancing recess 130, will become larger and conversely the vector 131 will become smaller. The sum of the vertical force components of vectors 132 and 131 will still equal the vector 133. However, the horizontal component of vector 132 will be larger than horizontal force component of vector 131. Since these horizontal components oppose each other, a net effective horizontal force, acting through the center of the bearing will result, tending to shift the cylinder barrel sleeve 35 from left to right within the available bearing clearance. Therefore in this arrangement, displacement of the barrel sleeve 35 in a horizontal direction by any external force or by hydrodynamic force generated in the bearing, will automatically induce an opposing rectifying force trying to maintain the cylinder barrel sleeve 35 symmetrically located in respect to the vertical axis within the available bearing clearance. This automatically self-induced rectifying force will greatly increase the stability of hydrostatic bearing.

It is to be understood also that for some applications the orifices 76 and 79a in the embodiment of FIGURES 1 through 9 may also take the form of capillary tubes similar to those shown in FIGURE 11.

While several embodiments of my invention have been shown and described, various other modifications and rearrangements may be resorted to by those skilled in the art without departing from the scope of the invention as defined in the appended claims.

What is claimed is:

1. In a fluid pressure energy translating device having a housing with a cylinder barrel rotatably disposed therein and pistons reciprocally disposed in said cylinder barrel and operative against cam means for reciprocation the improvement which comprises, support means adapted to journal said cylinder barrel, a source of fluid pressure, balancing means interposed between said source of fluid pressure and said cylinder barrel to balance the hydraulic reaction forces transmitted by said cylinder barrel to said support means by utilizing fluid energy from said fluid source, said cam means having a principal axis being defined by a line on the surface of said cam means passing through the axis of rotation of said cylinder barrel at the maximum angular inclination in respect to the axis of rotation of said cylinder barrel, said balancing member being located in a plane defined by said principal axis and the axis of rotation of said cylinder barrel, said balancing means including means to control the fluid flow and fluid pressure supplied by said source.

2. In a fluid pressure energy translating device having a housing with a cylinder barrel rotatably disposed therein and pistons reciprocally disposed in said cylinder barrel and operative against cam means for reciprocation the improvement which comprises, a support surface carried by said housing adapted to peripherally journal said cylinder barrel, a source of fluid pressure, first and second balancing means on opposite sides of the barrel interposed between said source of fluid pressure and said cylinder barrel to balance the hydraulic reaction forces transmitted by said cylinder barrel to said support means by utilizing fluid energy from said fluid source, said balancing means including means to control the fluid flow and fluid pressure supplied by said source, and means to selectively connect said first and second balancing means to the source of fluid pressure.

3. In a fluid pressure energy translating device having a housing with a cylinder barrel rotatably disposed therein and pistons reciprocally disposed in said cylinder barrel and operative against cam means for reciprocation the improvement which comprises support means carried by said housing adapted to peripherally journal said cylinder barrel, at least one balancing member adapted to direct pressure fluid against said cylinder barrel, a source of pressure fluid and fluid conducting means adapted to conduct fluid therefrom to each balancing member, said cam means having a principal axis being defined by a line on the surface of said cam means passing through the axis of rotation of said cylinder barrel at the maximum angular inclination in respect to the axis of rotation of said cylinder barrel, said balancing member being located in a plane defined by said principal axis and the axis of rotation of said cylinder barrel, and fluid metering means to restrict the flow of the pressure fluid to the balancing members, whereby to maintain the rotating barrel in a balanced state of floating equilibrium.

4. The combination of claim 3 further characterized by actuating means responsive to the angular inclination of the principal axis of said cam means, said actuating means arranged and constructed to operate said fluid metering means to regulate the quantity and pressure of fluid supplied to said balancing members responsive to the angular inclination of said cam means.

5. The combination of claim 4 wherein said fluid metering means includes at least one fluid flow constricting means.

6. The combination of claim 4 further characterized by fluid flow constricting means interposed between said fluid metering means and said balancing members.

7. The combination of claim 3 further characterized by first and second balancing members being disposed symmetrically with respect to each other and to said principal axis on opposite sides of the cylinder barrel.

8. The combination of claim 7 further characterized by said fluid metering means including fluid flow constricting means and fluid direction control means whereby the pressure fluid can be diverted selectively to said balancing members.

9. The combination of claim 8 further characterized by actuating means responsive to the angular inclination of the principal axis of said cam means, and the pressure fluid direction control means being operable by said actuating means, whereby the pressure fluid is diverted selectively to said balancing members depending on angular inclination of said cam plate.

10. The combination of claim 9 further characterized by said direction control means including pressure fluid throttling means responsive to the angular inclination of said cam plate, whereby the quantity of pressure fluid diverted to the balancing members is varied depending on the angular inclination of said cam plate.

11. The combination of claim 10 further characterized by fluid flow constricting means interposed between said throttling means and said balancing member.

12. In a fluid pressure energy translating device having a housing with a cylinder barrel rotatably disposed therein and pistons reciprocally disposed in said cylinder barrel and operative against cam means for reciprocation the improvement which comprises, a support surface carried by said housing adapted to peripherally support said cylinder barrel, at least one balancing recess adapted to direct pressure fluid against said cylinder barrel, a source of pressure fluid and fluid conducting means adapted to conduct fluid therefrom to each balancing recess, and fluid metering means in said fluid conducting means to restrict the flow of the pressure fluid to the balancing recesses, whereby to maintain the rotating barrel in a balanced state of floating equilibrium.

13. The combination of claim 12 wherein each balancing recess is enclosed by said support surface.

14. The combination of claim 12 further characterized by said fluid metering means including fluid flow constricting means.

15. In a fluid pressure energy translating device having a housing including inlet and outlet ports, shaft means journalled in said housing, a rotatable cylinder barrel in said housing driven by said shaft means, said cylinder barrel having cylinder bores with pistons mounted for reciprocation therein and operable against a cam plate, valve means to connect said cylinder bores in timed relation with said inlet and outlet ports, the improvement which comprises support means to journal said cylinder barrel in respect to said housing, said support means including means defining a cylindrical surface and engaging said cylinder barrel, balancing means enclosed by said cylindrical surface, means to divert high pressure fluid from one of said ports, fluid conducting means between said fluid diverting means and said balancing means to restrict the flow of pressure fluid to said balancing means, whereby the cylinder barrel is maintained in a balanced state of floating equilibrium in respect to said housing.

16. The device of claim 15 further characterized by said means to divert high pressure fluid from one of said ports including check valve means whereby the pressure fluid is supplied to said balancing means from a port carrying the pressure fluid.

17. In a fluid pressure energy translating device having a housing including inlet and outlet ports, shaft means journalled in said housing, a rotatable cylinder barrel in said housing driven by said shaft means, said cylinder barrel having cylinder bores with pistons mounted for reciprocation therein, said pistons having part spherical ends, a cam plate arranged to cooperate with said pistons to reciprocate said pistons, said cam plate having a principal axis defined by a line on the surface of the cam plate passing through the axis of rotation of said cylinder barrel at a maximum angular inclination in respect to the axis of rotation of said cylinder barrel, valve means to connect said cylinder bores in timed relation with said inlet and outlet ports the improvement which comprises, support means to journal said cylinder barrel in respect to said housing, said support means including means defining a cylindrical surface carried by said housing engaging said cylinder barrel, balancing means in said cylindrical surface, said balancing means located transversely on a plane defined by said principal axis and said axis of rotation of said cylinder barrel, said balancing means being further located on a plane normal to the axis of rotation of the cylinder barrel and passing through the point defined by intersection of the plane connecting centers of said part spherical piston ends with the axis of rotation of said cylinder barrel, a source of pressure fluid, fluid conducting means between said source of pressure fluid and said balancing means, and fluid metering means in said fluid conducting means to restrict the flow of pressure fluid to said balancing means, whereby the cylinder barrel is maintained in a balanced state of floating equilibrium in respect to said housing.

18. The combination of claim 17 further characterized by a plurality of said balancing means symmetrically disposed in respect to each other and to said principal axis of said cam plate, actuating means responsive to the angular inclination of the principal axis of said cam plate, said actuating means arranged and constructed to operate said fluid metering means to regulate the quantity of pressure fluid supplied to said balancing means responsive to the angular inclination of said cam means.

19. The device of claim 18 further characterized by direction control means operable by said actuating means to divert the pressure fluid selectively to said balancing means depending upon the angular inclination of said cam plate.

20. In a fluid energy translating device having a housing with a cylinder barrel rotatably disposed therein and pistons reciprocally disposed in said cylinder barrel and operative against cam means for reciprocation, said cam means having principal axis, said principal axis being defined by a line on the surface of said cam means passing through the axis of rotation of said cylinder barrel at the maximum angular inclination in respect to the axis of rotation of said cylinder barrel the improvement which comprises support means carried by said housing adapted to peripherally journal said cylinder barrel, at least two balancing members adapted to direct pressure fluid against said cylinder barrel, said two balancing members being substantially symmetrically disposed in respect to said principal axis and adjacent each other, a source of pressure fluid and fluid conducting means adapted to conduct fluid therefrom to each balancing member simultaneously, and fluid metering means operatively connected to each balancing member and arranged to restrict the flow of the pressure fluid to each balancing member, whereby to maintain the rotating barrel in a balanced state of floating equilibrium and to maintain said barrel symmetrically disposed in respect to said balancing members within the available clearance between said support means and said cylinder barrel.

21. The combination of claim 20 wherein each of said metering means includes fluid restricting means, said fluid restricting means being of equal resistance.

22. The combination of claim 21 wherein each of said fluid restricting means includes a capillary tube.

23. In a fluid energy translating device having a housing with a cylinder barrel rotatably disposed therein and pistons reciprocally disposed in said cylinder barrel and operative against cam means for reciprocation the improvement which comprises support means adapted to peripherally journal said cylinder barrel, at least one balancing member adapted to direct pressure fluid against said cylinder barrel, a source of pressure fluid and fluid conducting means adapted to conduct fluid therefrom to each balancing member, and fluid flow control means interposed between said source of pressure fluid and said balancing members, said fluid control means including means to provide a constant flow of pressure fluid to said balancing members to maintain the rotating barrel in a balanced state of floating equilibrium.

24. The combination of claim 23 further characterized by said fluid flow control means having adjusting means to vary the flow level of pressure fluid directed to said balancing members.

25. The combination of claim 24 further characterized by said adjusting means including means responsive to the angular inclination of said cam means to vary the quantity of pressure fluid diverted to the balancing members in respect to the angular inclination of said cam means.

References Cited by the Examiner

FOREIGN PATENTS 1,216,069  11/59  France.

RICHARD B. WILKINSON, *Primary Examiner.*